US011103814B2

(12) United States Patent
Noling et al.

(10) Patent No.: US 11,103,814 B2
(45) Date of Patent: Aug. 31, 2021

(54) SATURATED LAYER STORMWATER FILTER AND PASSIVE STORMWATER MANAGEMENT SYSTEM WITH PRETREATMENT

(71) Applicant: StormwateRx, LLC, Portland, OR (US)

(72) Inventors: Calvin Paul Noling, Portland, OR (US); Daniel Michael Joseph, Portland, OR (US)

(73) Assignee: STORMWATERX, LLC, Portland, OR (US)

( * ) Notice: Subject to any disclaimer, the term of this patent is extended or adjusted under 35 U.S.C. 154(b) by 778 days.

(21) Appl. No.: 15/594,556

(22) Filed: May 12, 2017

(65) Prior Publication Data

US 2017/0326478 A1 Nov. 16, 2017

Related U.S. Application Data

(60) Provisional application No. 62/335,598, filed on May 12, 2016.

(51) Int. Cl.
*B01D 29/56* (2006.01)
*B01D 15/36* (2006.01)
(Continued)

(52) U.S. Cl.
CPC ......... *B01D 29/56* (2013.01); *B01D 15/361* (2013.01); *B01D 17/0208* (2013.01); *B01D 24/007* (2013.01); *B01D 24/105* (2013.01); *B01D 24/14* (2013.01); *C02F 1/004* (2013.01); *E04D 13/08* (2013.01); *B01D 2201/10* (2013.01); *B01D 2201/44* (2013.01); *B01D 2201/48* (2013.01); *C02F 1/006* (2013.01); *C02F 1/281* (2013.01); *C02F 1/283* (2013.01);
(Continued)

(58) Field of Classification Search
CPC .......................... C02F 1/006; C02F 2103/001; C02F 2303/24; C02F 1/004; B01D 15/361; B01D 2201/10; B01D 29/56; E04D 13/08; E04D 2013/0806; E04D 2013/086
See application file for complete search history.

(56) References Cited

U.S. PATENT DOCUMENTS 248,574 A 10/1881 Burkhardt
962,606 A 6/1910 Wiest
(Continued)

OTHER PUBLICATIONS

International Search Report and Written Opinion dated Aug. 24, 2017, for PCT Application No. PCT/US2017/32567.

*Primary Examiner* — Ana M Fortuna
(74) *Attorney, Agent, or Firm* — Buchalter; Cecily Anne O'Regan

(57) ABSTRACT

A saturated layer stormwater filtering system with downflow layered multimedia filters is disclosed. The filtering system may include an upflow pretreatment chamber and a subsequent filtration chamber. It also includes a snorkel pipe as an adjustable head control or internal baffles. The system incorporates gravity powered partially saturated stormwater media filters to harness the potential energy of stormwater from downspouts and pumped flows from stormwater catchments to drive the polluted stormwater in a hydraulically controlled fashion by gravity through a series of filter media layers.

20 Claims, 17 Drawing Sheets

(51) Int. Cl.
  *C02F 1/00*    (2006.01)
  *B01D 17/02*   (2006.01)
  *B01D 24/00*   (2006.01)
  *B01D 24/10*   (2006.01)
  *B01D 24/14*   (2006.01)
  *C02F 1/28*    (2006.01)
  *C02F 103/00*  (2006.01)
  *C02F 101/20*  (2006.01)
  *C02F 101/32*  (2006.01)
  *E04D 13/08*   (2006.01)

(52) U.S. Cl.
  CPC ...... *C02F 2101/20* (2013.01); *C02F 2101/32* (2013.01); *C02F 2103/001* (2013.01); *C02F 2209/42* (2013.01); *C02F 2301/022* (2013.01); *C02F 2303/24* (2013.01); *E04D 2013/0806* (2013.01); *E04D 2013/086* (2013.01); *Y02A 20/152* (2018.01)

(56) References Cited

U.S. PATENT DOCUMENTS

| | | | | |
|---|---|---|---|---|
| 3,554,377 | A * | 1/1971 | Miller | B01J 47/028 210/275 |
| 4,717,476 | A * | 1/1988 | Scott | C02F 9/005 210/266 |
| 4,750,999 | A * | 6/1988 | Roberts | B01D 24/4631 210/266 |
| 5,679,256 | A | 10/1997 | Rose | |
| 5,820,762 | A | 10/1998 | Bamer et al. | |
| 5,897,777 | A * | 4/1999 | Zoeller | C02F 3/28 210/602 |
| 5,958,239 | A * | 9/1999 | Sing | C02F 3/02 210/150 |
| 5,993,672 | A | 11/1999 | Manz | |
| 6,123,858 | A * | 9/2000 | Manz | B01D 24/14 210/104 |
| 6,248,233 | B1 | 6/2001 | Priggemeyer et al. | |
| 6,632,501 | B2 | 10/2003 | Brownstein et al. | |
| 6,908,540 | B2 * | 6/2005 | Kholodenko | C25D 7/12 204/224 R |
| 6,908,549 | B2 | 6/2005 | Middleton et al. | |
| 7,005,060 | B2 | 2/2006 | Pitt et al. | |
| 7,025,887 | B1 * | 4/2006 | Kirts | B01D 21/0003 210/170.03 |
| 7,300,590 | B2 | 11/2007 | Weir et al. | |
| 7,805,890 | B2 | 10/2010 | Esmond et al. | |
| 8,002,974 | B2 | 8/2011 | Noling et al. | |
| 8,002,984 | B1 * | 8/2011 | Wanielista | B01J 20/043 210/602 |
| 8,012,346 | B2 | 9/2011 | Peters, Jr. et al. | |
| 8,894,866 | B1 | 11/2014 | Belasco | |
| 9,315,406 | B2 * | 4/2016 | Strano | C02F 9/00 |
| 2002/0096466 | A1 | 7/2002 | Perry et al. | |
| 2004/0173522 | A1 * | 9/2004 | Allard | E03F 1/002 210/602 |
| 2005/0183997 | A1 * | 8/2005 | Happel | B01D 21/0012 210/163 |
| 2007/0181486 | A1 * | 8/2007 | Ashliman | B01D 29/23 210/323.1 |
| 2008/0197083 | A1 * | 8/2008 | Raveneau-Champion | C02F 3/32 210/747.3 |
| 2008/0251448 | A1 | 10/2008 | Kent | |
| 2009/0101555 | A1 * | 4/2009 | Scarpine | C02F 1/004 210/170.03 |
| 2010/0326904 | A1 | 12/2010 | Lord | |
| 2012/0152827 | A1 * | 6/2012 | Allard | E03F 5/101 210/602 |
| 2013/0292317 | A1 | 11/2013 | Shaw et al. | |
| 2014/0021137 | A1 | 1/2014 | Smiddy et al. | |
| 2015/0337350 | A1 * | 11/2015 | Ram | C02F 1/00 435/39 |
| 2020/0115890 | A1 * | 4/2020 | Roseen | B01D 21/0006 |

\* cited by examiner

TOP VIEW WITH OPEN LID

SIDE VIEW

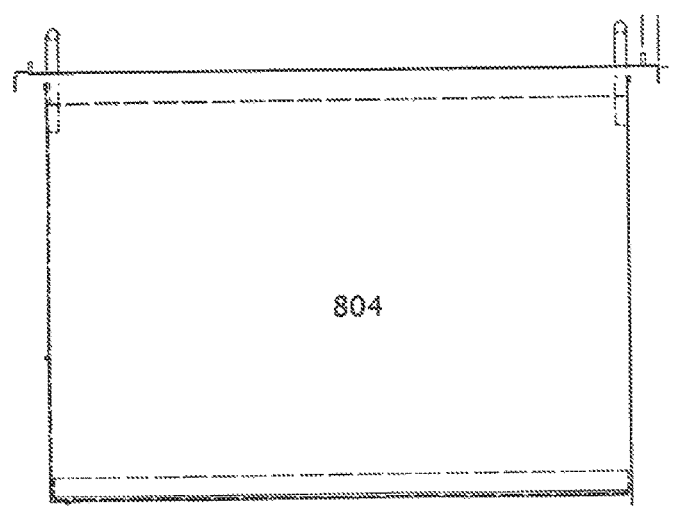 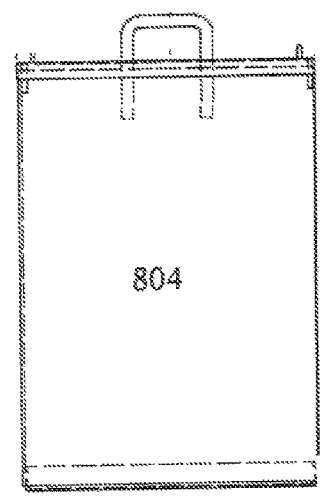
FIG. 9A — Side View
FIG. 9B — End View

SATURATED LAYER STORMWATER FILTER AND PASSIVE STORMWATER MANAGEMENT SYSTEM WITH PRETREATMENT

CROSS-REFERENCE TO RELATED APPLICATION

The application claims the benefit of Provisional Application Ser. No. 62/335,598, entitled "Saturated Layer Stormwater Filter" filed on May 12, 2016, the subject matters of which is incorporated herein by reference in its entirety.

TECHNICAL FIELD

This invention relates generally to the field of stormwater management. More particularly, it concerns treating stormwater inflow or influent to produce a purified stormwater outflow or effluent.

BACKGROUND

Conventional stormwater filter systems for influent pollutant control and removal are subject to numerous previously unsolved problems. These problems include ineffective use of filter surface area due to a single inlet pipe, pitting of the filter media underneath such a single inlet pipe, uncontrolled water fall speeds through the filter media that promotes short-circuiting and increased particle shear forces causing loss of accumulated particulates into the effluent, uncontrolled water fall through reactive filter media (insufficient "contact time") that reduces removal of dissolved pollutants, automatic water level controls that stick or otherwise fail, uncontrolled acidic pH levels in the influent that render toxic heavy metals more soluble and thus more difficult and expensive to capture in a filter, etc.

Also, rainwater that lands on outdoor work areas and even rooftops can slowly dissolve and erode building materials and cause pollution of downstream waterways by particulates and heavy metals, including dissolved or ionized heavy metals that are particularly difficult to remove. Examples of polluting heavy metals include zinc, copper, iron, aluminum and lead.

The United States National Pollutant Discharge Elimination System (NPDES) permitting program regulates the quantity and quality of stormwater discharges to receiving waters. Certain categories of industrial facilities are regulated under NPDES industrial stormwater permits as point sources and the amount of pollutants contained in the stormwater discharges is required to be controlled according to these permits. Stormwater that has flowed across outdoor work areas, rooftops and the rooftop equipment common to industrial facilities, in many cases, is of poor quality and the ratio of dissolved or ionized pollutants to total pollutants is high. Removal of ionized heavy metals from stormwater is technically challenging.

Some stormwater pollution controls may include downspout filters and also filtration systems for treating stormwater runoff from sheet flow off pavement/graded surfaces which may then be filtered by gravity or collected and pumped up to the filtration system. Many such filters remove debris and particulates but their capacity and efficiency for removal of ionized or dissolved metals is low. Other downspout filters unsatisfactorily export nutrients or other pollutants in the process of removing the ionized heavy metals.

Accordingly it may be desirable to have a stormwater processing system with improved filtration performance, in particular in removing ionized heavy metals.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A unique saturated layer stormwater filter as described herein provides a single chamber down-flow layered multimedia filters, that consists of several layers of screens, fabrics, and media types that are intended for sequential treatment of water removing the largest size materials first and dissolved constituents last. At its outlet the system includes a snorkel pipe or internal baffles to create a flooded distribution of stormwater that advantageously controls the untreated stormwater effluent flow across and subsequently through the filter media. The stormwater flows by the force of gravity through the filter media. Accordingly the media is more effective in filtration when kept saturated. The system is constructed so that the filter media is saturated, in that some or all of the filter media remains submerged in the stormwater being treated. This particular filter is typically useful as a downspout filtration system, or to treat stormwater runoff from outdoor work areas. The filter may be advantageously coupled to a downspout or may receive pumped stormwater from a below ground vault or other retention vessel holding stormwater to be treated. Thus, a portable, gravity powered "partially saturated stormwater media filter" has been constructed that tends to harness the potential energy of stormwater to drive the polluted stormwater in a hydraulically controlled fashion by gravity through a series screens, fabrics, and media layers Although some of the present examples are described and illustrated herein as being implemented in a downspout system, the system described is provided as an example and not a limitation. For example, the passive stormwater management system with upflow pretreatment may provide even more of a robust filtration system. As those skilled in the art will appreciate, the present examples are suitable for application in a variety of different types of waste water or runoff treatment systems.

The stormwater filter may also be used in combination with various stormwater conveyance controls. Additional examples below describe a saturated layer filter and passive stormwater management system with pretreatment used in conjunction with other stormwater conveyance control systems. In the saturated layer filter and passive stormwater management system with pretreatment, one possible option is shown with the saturated layer storm water filter used in conjunction with a below ground separator vault.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

Saturated Layer Stormwater Filter

FIGS. 9A-9B show the construction of an example of a removable filter basket utilized in FIG. 8 from a side view (FIG. 9A) and an end view (FIG. 9B).

Saturated Layer Stormwater Filter with Pretreatment

Figure 10:
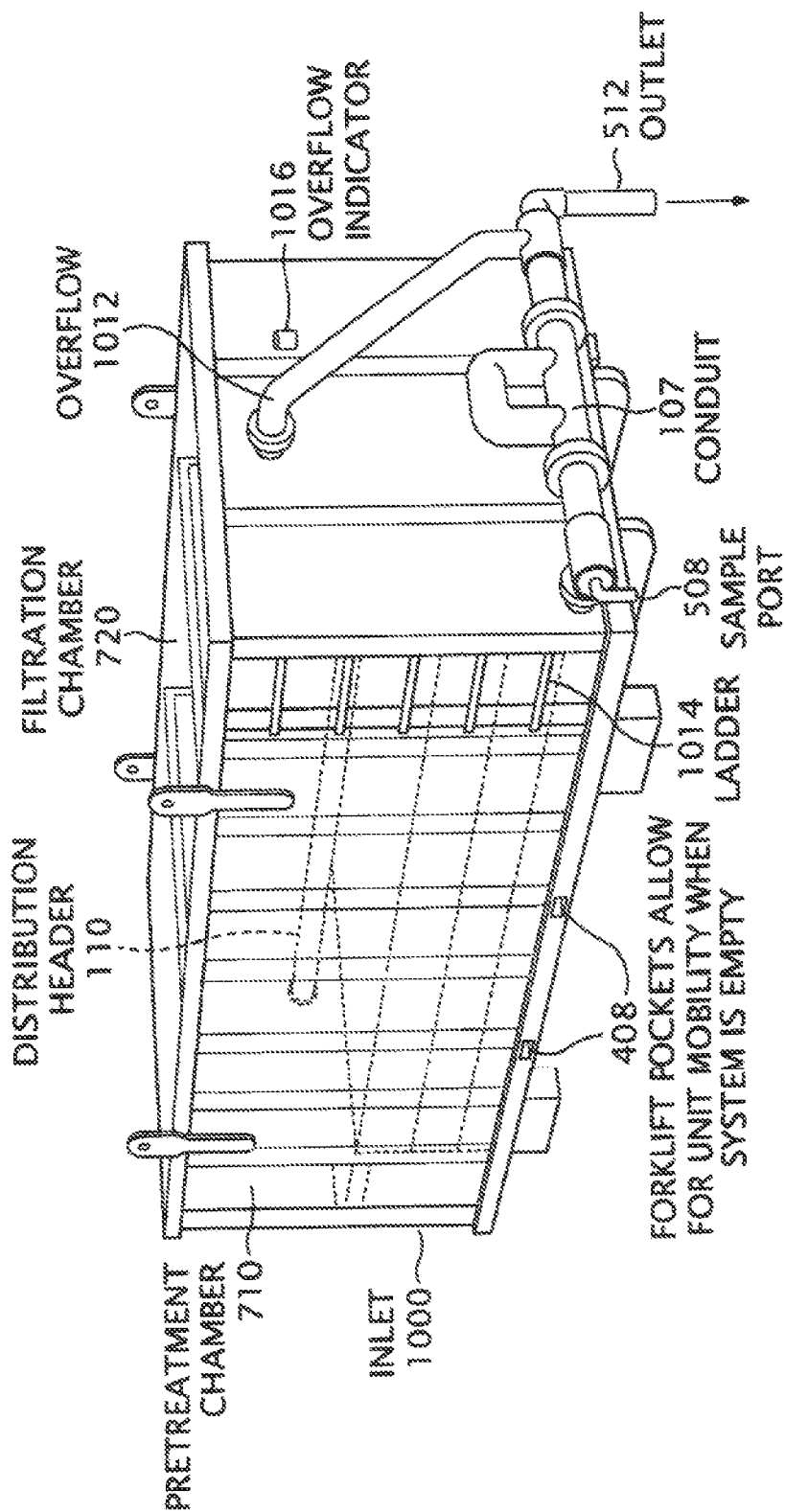

FIG. 10 shows a perspective cut away view of an exemplary stormwater filter system with an upflow pretreatment chamber.

Figure 7:
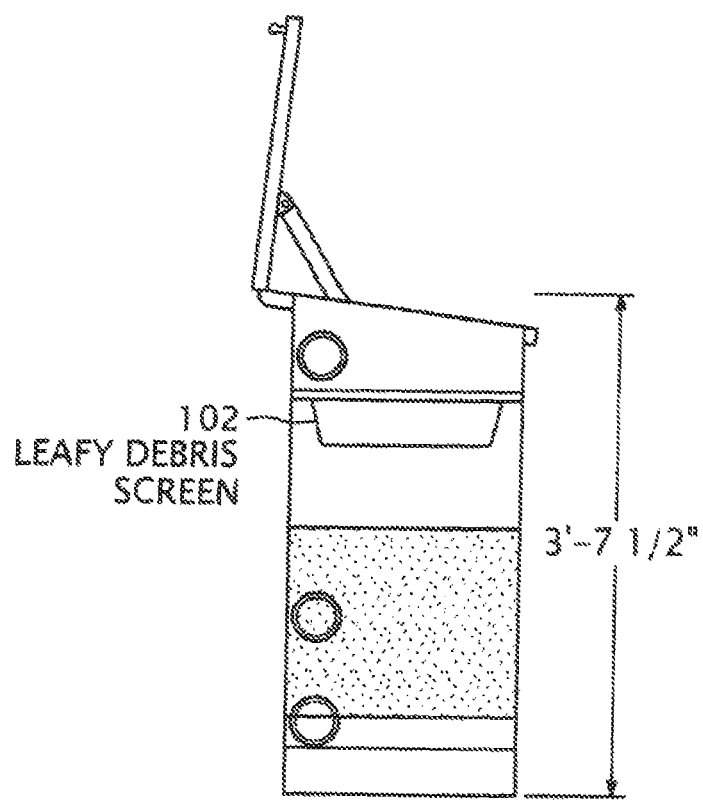
Figure 11:
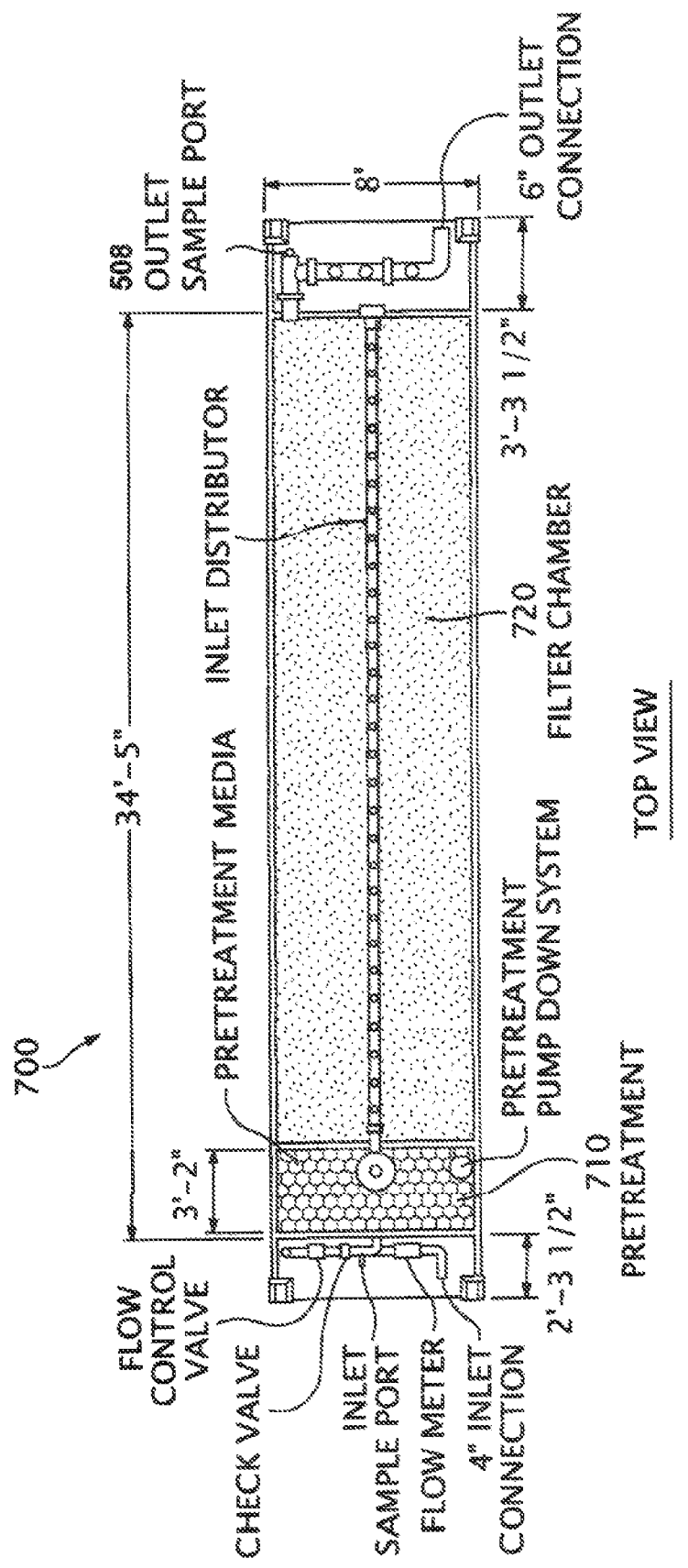

FIG. 11 shows a top view of the exemplary stormwater filter system shown in FIG. 7 having an upflow pretreatment chamber.

Figure 12:
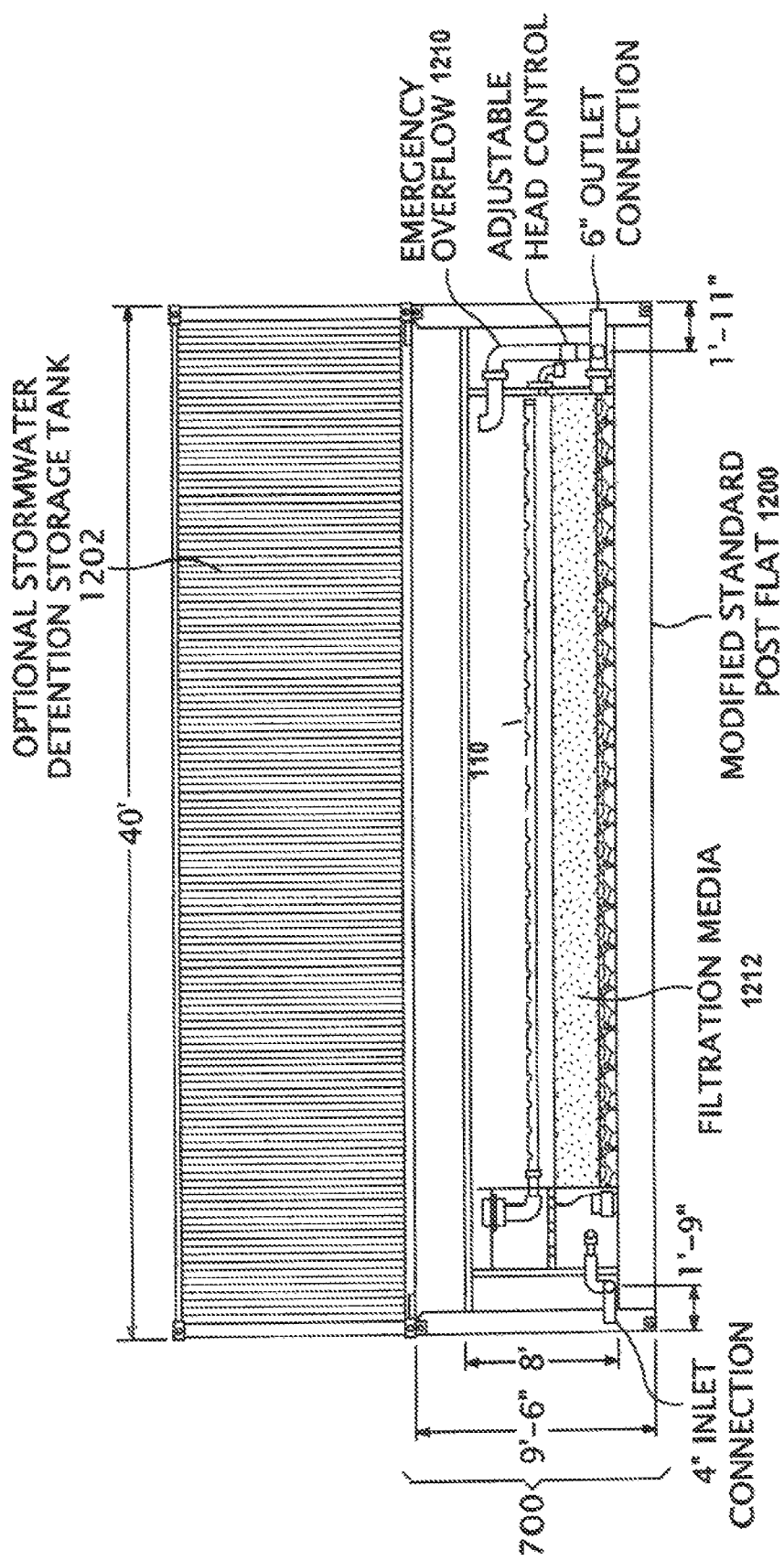

Stormwater Conveyance Control with Saturated Layer Stormwater Filter with Pretreatment FIG. 12 is a side sectional view of detention stormwater conveyance control with a saturated layer stormwater filter with pretreatment in an intermodal container configuration, modified standard post flat design.

Figure 13:
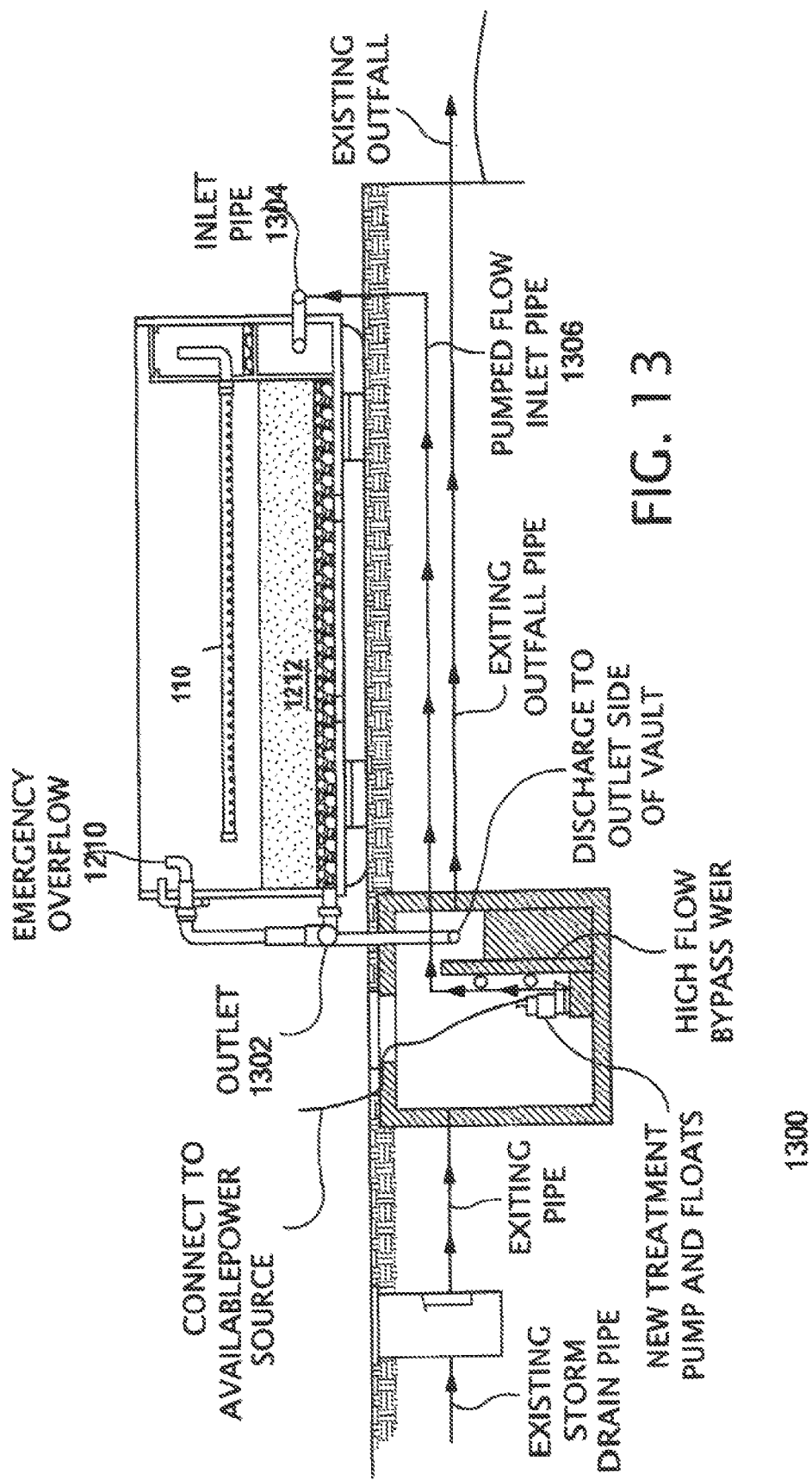

FIG. 13 shows a treatment system that includes a saturated layer stormwater filter with pretreatment with a stormwater conveyance control bypass pump vault.

Figure 14:
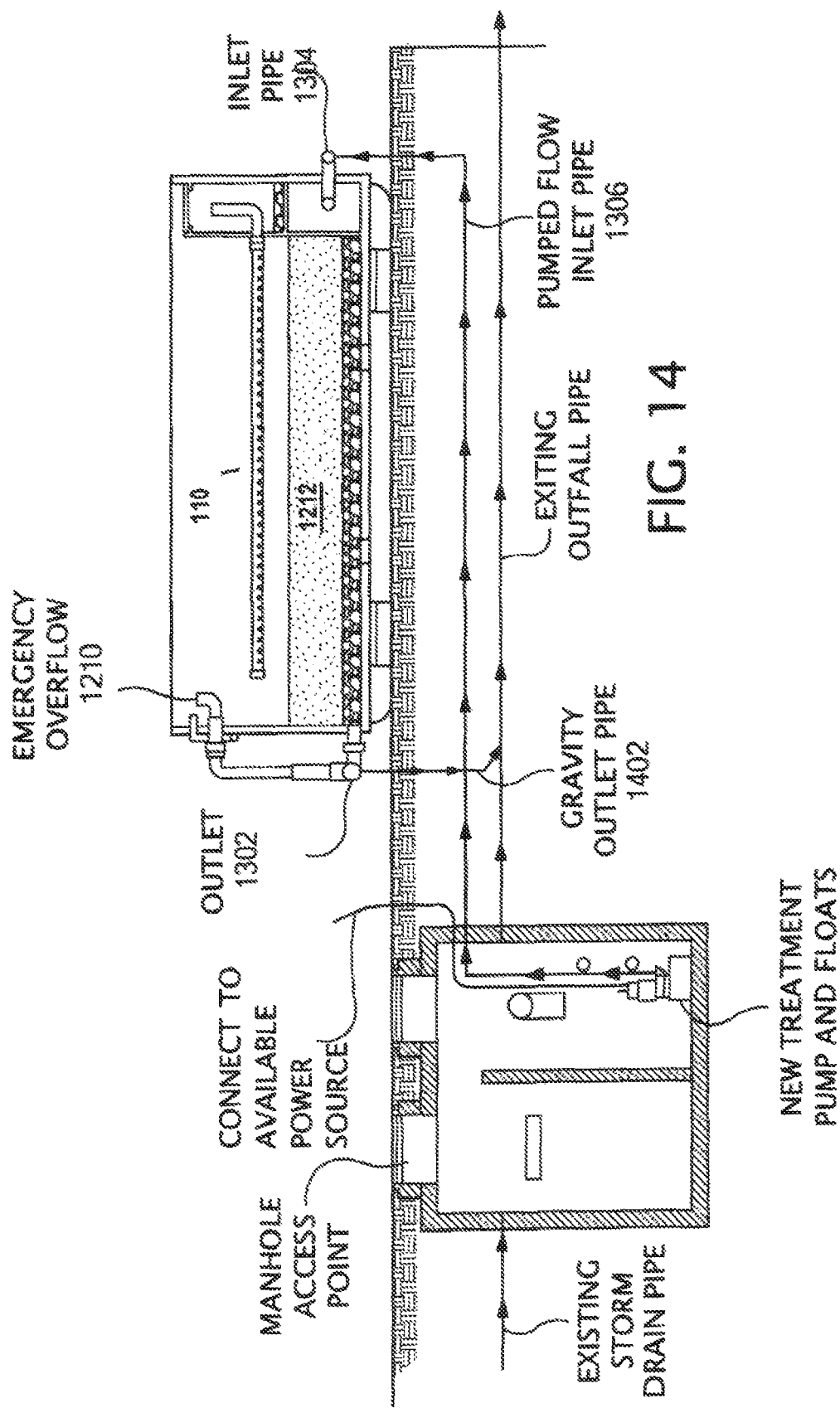

FIG. 14 shows a treatment system that includes a saturated layer stormwater filter with pretreatment with a CLARA stormwater conveyance control configuration.

Figure 1:
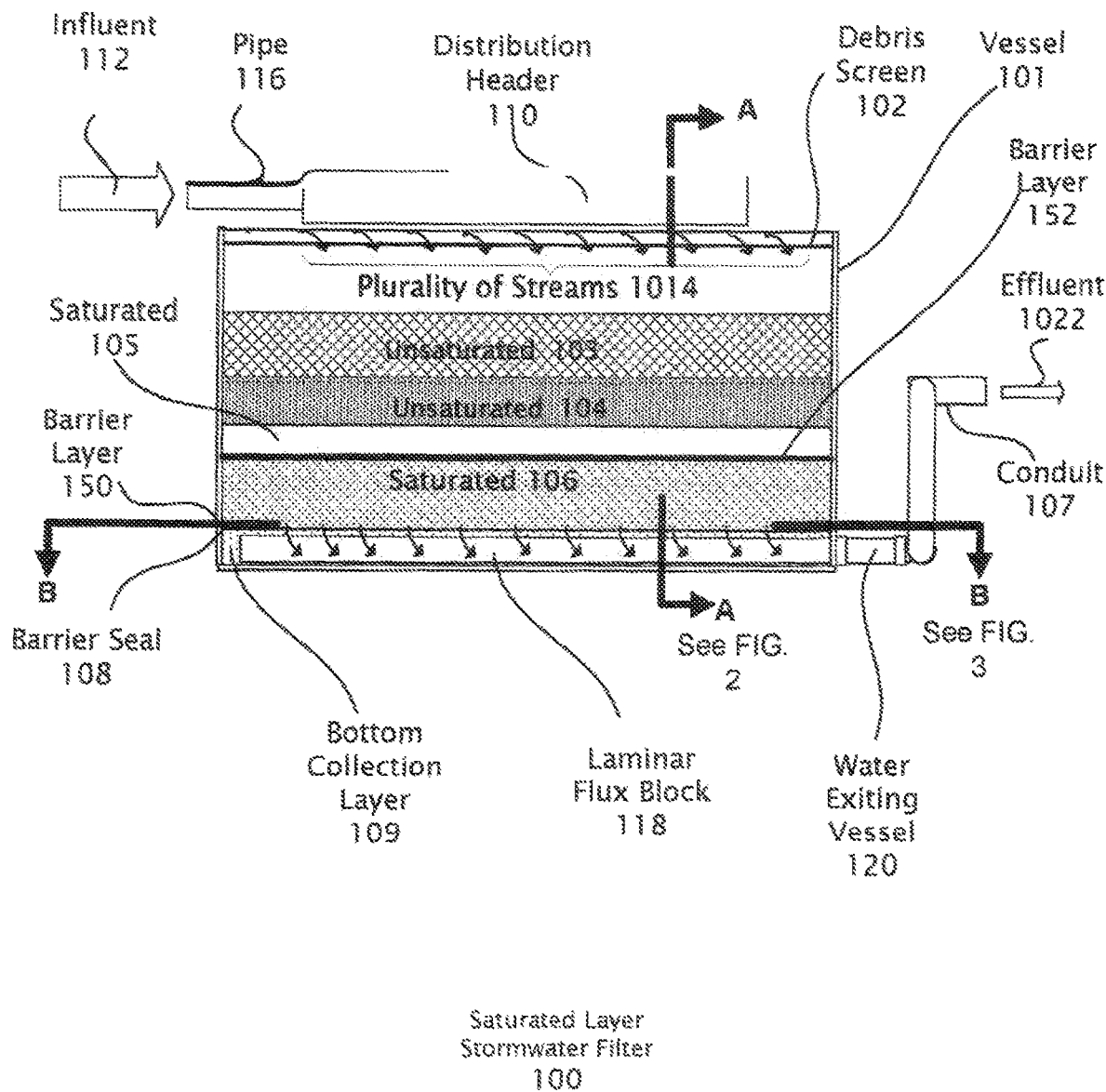
FIG. 1 shows a cut away side view of the saturated layer stormwater filter.
Figure 6:
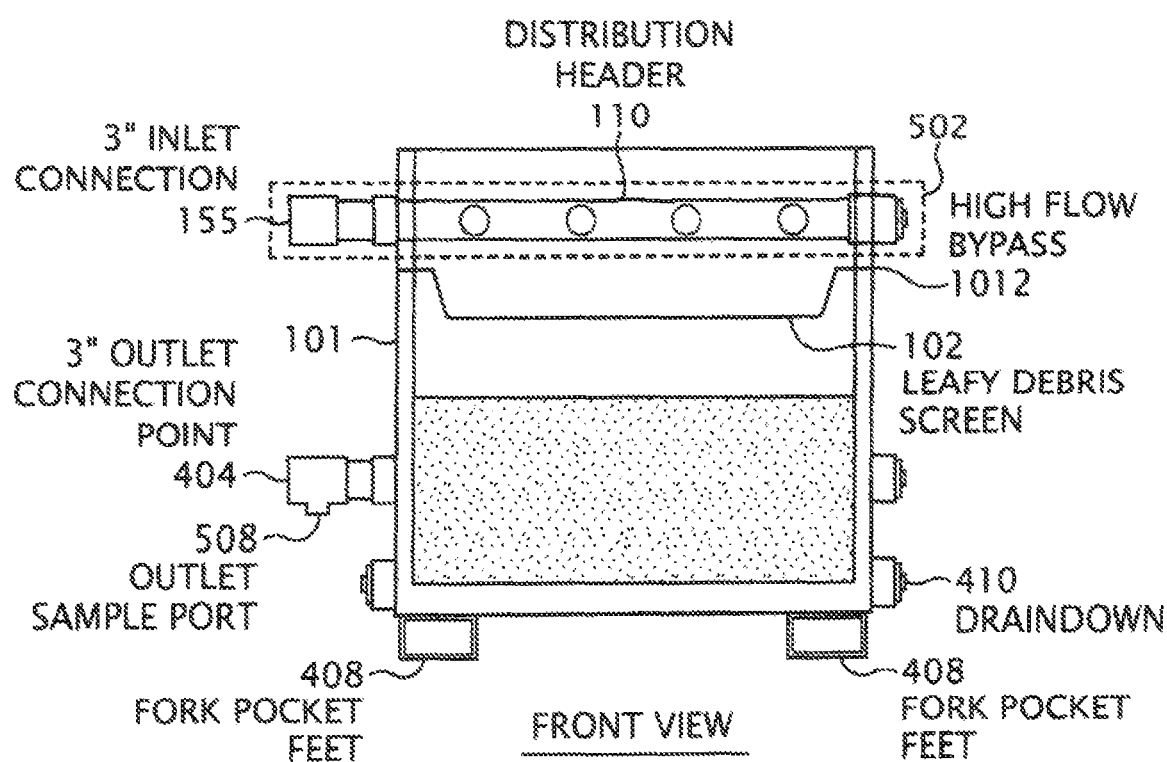
Figure 15:
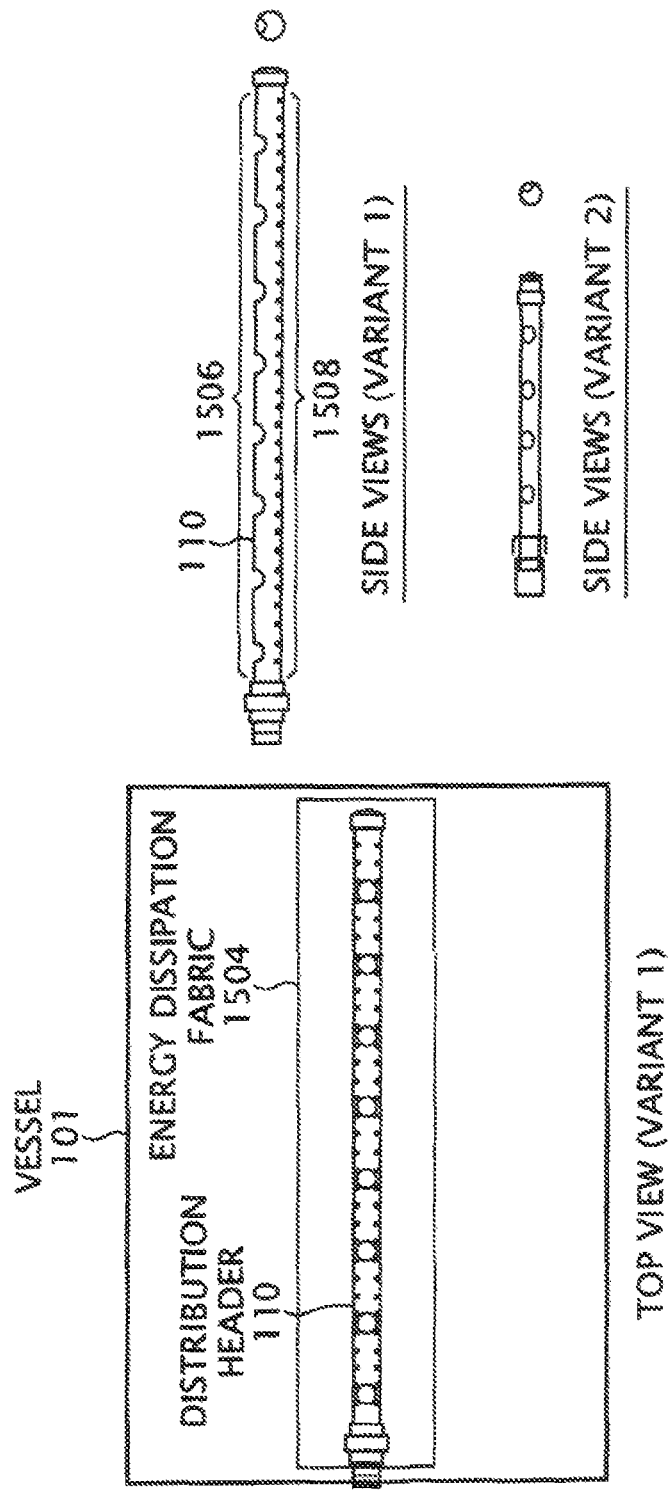

FIG. 15 shows the construction of a distribution header utilized in FIGS. 1 and 6.

Saturated Layer Stormwater with Downflow Pretreatment

Figure 2:
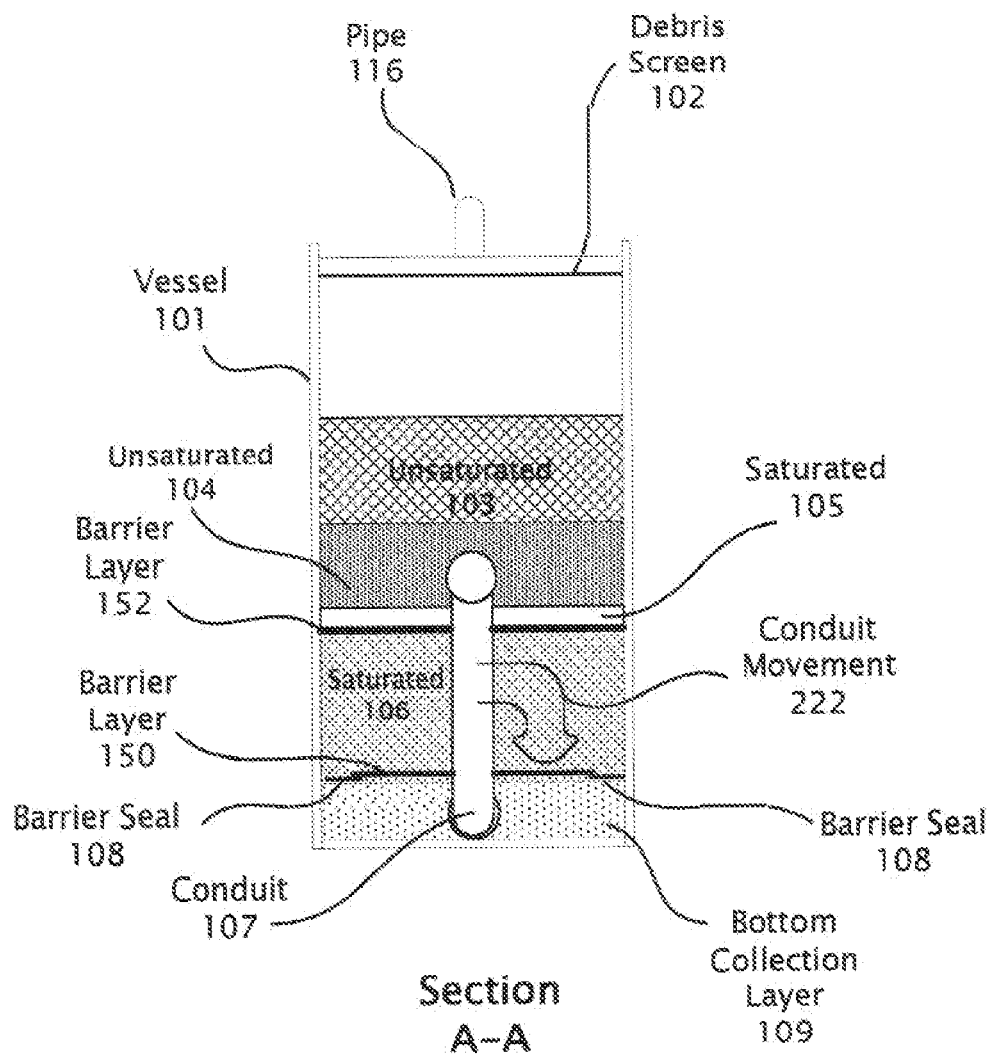
FIG. 2 shows a cut away end view of the saturated layer stormwater filter.
Figure 16:
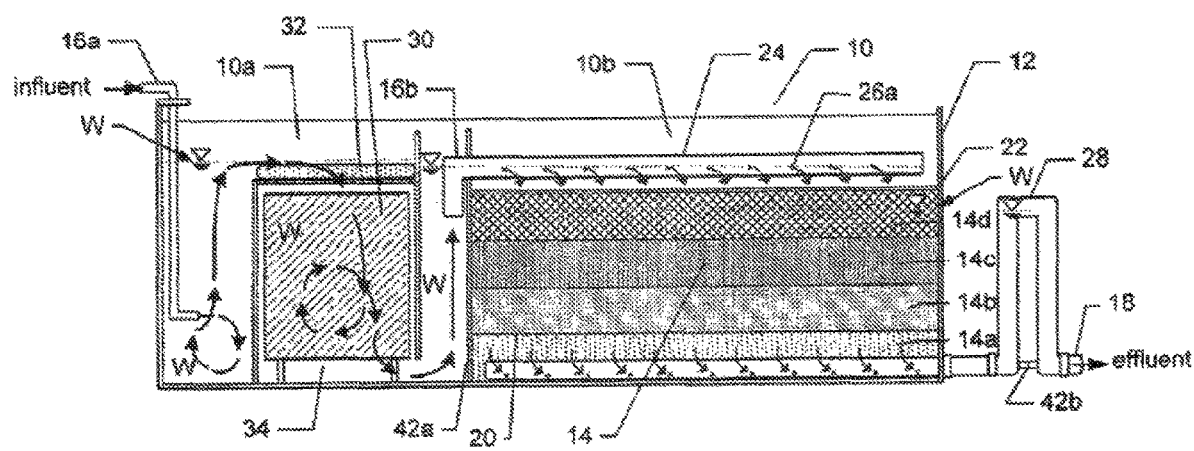

FIG. 16 shows a side view of the exemplary stormwater filter system shown in FIGS. 1-2 having an downflow pretreatment chamber.

Figure 17:
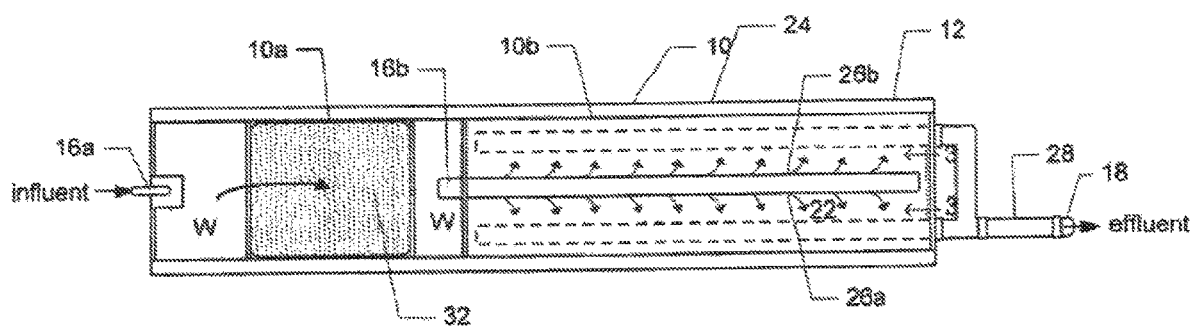

FIG. 17 shows a top view of the exemplary stormwater filter system of FIG. 16.

Like reference numerals are used to designate like parts in the accompanying drawing.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe examples of a stormwater filtering system. Although the present examples are described and illustrated herein as being implemented for stormwater filtering, the system described is provided as an example and not a limitation. As those skilled in the art will appreciate, the present examples are suitable for application in a variety of different types of water processing and filtering systems that may incorporate a stormwater filter as a component of a filtration system.

The invention in accordance with the following examples involves stormwater management system and apparatus for removing high levels of heavy metal toxins, nutrients, particulates, or other pollutants from stormwater influent. The output produced is a relatively clean effluent having low levels of heavy metal toxins, particulates, nutrients, and other pollutants that may be found in typical stormwater runoff.

The terms "layer", "media", "block", and their synonyms and plural forms, as may be used herein, are intended to provide descriptive references or landmarks with respect to the object being described. These terms are not intended, nor should be inferred, to delimit or define per se elements of the referenced object, unless specifically stated as such or facially clear from the several drawings and the context in which the term(s) is/are used. In addition, the terminal ends of any numeric lead lines in the several drawings, when associated with any such term(s), are intended to representatively identify such references or landmarks with respect to the object being described. They are not intended, nor should be inferred, to delimit or define per se boundaries of the referenced object, unless specifically stated as such or facially clear from the drawings and the context in which the term(s) is/are used.

Saturated Layer Stormwater Filter

FIGS. 1-2 show various views of the saturated layer stormwater filter 100 described herein. Such a filter may be utilized to filter runoff, or stormwater that may be contain pollutants such as particulate matter, metals, nutrients, chemical compounds and the like. It is typically desirable to filter stormwater to prevent, or minimize contamination or pollutants from entering the environment. The filter 100 is saturated in that portions of the filter media is typically kept flooded with stormwater during use. Additionally, the filter tends to spread the stormwater over a large filter surface, and allows it to slowly flow through the filter, increasing the filtration efficiency, due to prolonged contact and low intra-media water flow velocity with filter media contained therein. The stormwater filter described below is advantageously utilized in installations to remove contaminates such as zinc and copper from roof water runoff. However those skilled in the art will appreciate that the stormwater filter may be utilized in many alternative filtration applications.

The stormwater filter may include a generally water tight container or vessel 101 that may be sealed by a lid or other suitable cover typically having four sidewalls and a base, the vessel configured to contain a defined volume of layered filter media 103, 104, 105, 106 entrained with a defined volume of water introduced into the vessel. Barrier layers 150, 152 may be of geotextile or equivalent and are provided to separate filter media layers. The vessel 101 may be constructed of any suitable material, and may be portable or fixed in nature. The vessel 101 may also be of any suitable shape including cubic, cylindrical or the like. Its volume is selected using techniques known to those skilled in the art to satisfactorily process and otherwise contain a given stormwater input. Alternatively a fixed filter structure may be provided with a removable substructure, so that spent filter material may be easily replaced. Apparatus will be understood to be a flow-through apparatus, in that the influent at the inlet is gravity fed to the outlet as effluent, whether in batch or continuous mode of filter operation.

In accordance with one example of invention, a stormwater inlet 112 near an upper edge of a layered filter media container is coupled to a distribution header assembly (or equivalently a baffle structure) 110 that ensures effective use of the considerable surface area of the filter media by providing a plurality of spaced streams 1014-- of stormwater across the top most filter media layer 103. Construction is such that each point of impact onto the filter media has its energy dissipated by a layer of material 102 that covers the upper layered filter media surface including, in some cases, a debris screen 102 may be suspended over the media surface between the distribution header 110 and the topmost media layer 103. The stormwater inflow may be metered to substantially saturate the layered filter media, thereby slowing the mean free path of the storm water through the filter 100 and increasing efficient particulate, heavy metal toxin and other pollutant capture by the various filter layers: first unsaturated layer 103, second unsaturated layer 104, first saturated layer 105, and second saturated layer 106.

Stormwater influent 112-- enters the filter vessel 101 through a distributor pipe 116. The distribution header 110 disperses the hydraulic energy of the flow through a debris screen 102 that may consist of a rack system with various granular media, a fabric basket or the like.

In alternative examples, particularly in FIG. 10, the debris screen may be constructed within a second separate chamber than that of the filtration media (see 710 of FIG. 10) typically for larger capacity systems (see 1000 of FIG. 10). This debris screen 102 provides pre-filtration of debris prior to water reaching the filtration chamber (720 of FIG. 10) filter media surface. In such larger systems (see FIG. 10), an additional distribution header or pipe (110 of FIG. 10) may also be incorporated at the filtration chamber to spread water over the filter surface and optimize the contact area of stormwater with filtration media. The debris screen or an additional fabric layer may also function to dissipate energy of falling stormwater to prevent or minimize surface filter media pitting.

Returning to FIGS. 1-2, the sequential treatment of stormwater continues inside the filtration media as the stormwater travels through the media layers 103, 104, 105, 106. The filtration media layers consist of inert and reactive media to remove stormwater pollutants such as metals, particulates, oil, organics and nutrients. These medias may be layered to remove the coarse fraction (and the most massive) of solids in the top layer. Finer filtration of smaller particulates (i.e. silts and clays) and larger dissolved constituents (i.e. hydrocarbons) may be trapped in the middle layers of the filter bed, and the smallest dissolved constituents (i.e. dissolved metals) may be removed in the lowest layers consisting of one or more reactive medias. Particulate pollutants that can foul a sorptive media's efficiency for removal of ionized or dissolved metals and need to be removed first. Pollutant removal occurs through a combination of straining, filtration, complexing, adsorption, absorption, micro-sedimentation, and biological degradation, producing excellent water quality.

The top layers of filter media are typically the "unsaturated filter media" layers 103 and 104. These layers are where the majority of the solid particulates are typically strained from the stormwater and range from 0.25-1.5 mm in size range. Layers 103 and 104 may be made up of several layers or more depending on the water chemistry being addressed as will be appreciated by those skilled in the art. Barrier layer 152 typically is made up of a geotextile material, or its equivalent, to separate layers 104 from 105.

The saturated media layers 105 and 106 may be located beneath the unsaturated filter media layers. Layers 105 and 106 may be made up of a plurality of layers depending on the water chemistry being addressed, but are typically of reactive nature to pull dissolved constituents from of the stormwater. Examples of these reactive medias are activated carbon, zeolite, and organoclay, or the like. Those skilled in the art will appreciate that the number of layers and the materials in the layers may be varied to achieve a desired level of filtration, and flow rate through the filter structure. Barrier layer 150 is made up of geotextile, fabric, perforated stainless steel, plastic grid or perforated plastic, or the like.

Saturated layers 105 and 106 receive the benefit of optimized contact time and water dispersion through a combination of uniform flow restriction within the media due to the saturated media layer and an evenly distributed laminar flux block (which may include porous pipe) 118 collecting water from the upper layers. This laminar flow pattern tends to promote high ionized and/or dissolved metals removal efficiency. This is an improvement to fully unsaturated filters that can experience pre-mature pollutant breakthrough and loss of filter effectiveness.

At the bottommost collection layer 109 the filtered water is collected in a laminar flux block 118 allowing it to exit the vessel 120. Also inclusion of a "barrier seal" 108 (further described below) tends to keep the medias in place and prevent the layers from migrating through the filter. This seal may be of geotextile, granular media, or any suitable material.

Water drains from the vessel through a "standing water colunm" conduit 107 that may consist of a snorkel pipe or internal baffles. This is what creates the saturated layer inside the filter bed. The weight of the water within the filter vessel 101 forces the stormwater down through the media into the saturated media laminar flux block 118 and out of the standing water column conduit 107. The standing water column conduit 107 typically is oriented in a vertical position, and is pivotally coupled (conduit movement 222) to the end of the bottom collection pipe where the water exits 1022 and 512. Accordingly, in one variant, the standing water-column conduit 107 may be continuously varied from vertical to horizontal in position. The standing water column conduit may be pivotally adjustable downwards (from the vertical position), to allow draining down of the filter for easier maintenance of the unsaturated media and assure optimal water/filter media contact under a range of operating conditions.

Also, the water column conduit provides simple, manual operability to adjust the media saturation level of water within vessel. The standing water column conduit 107 can be pivoted to set the media saturation water level within the vessel anywhere between the highest and lowest levels by pivoting it between the vertical and the horizontal. Standing water column conduit 107 may be pivotally connected to the vessel through a conventional coupling. Those of skill will appreciate that the water within the vessel will seek the same level, e.g. "track", the water column level within the standing water column conduit 107. Thus the media saturation level is failsafe and can be quickly and manually adjusted without resort to leaky siphons, or difficult to control flow control valves used conventionally.

An integration pipe connection or adapter (not shown) coupled to the outlet of the conduit 107 may reconnect the water flowing from this controller to the original downspout piping or facility drainage infrastructure. The system outlet plumbing may include a sample port (not shown) which provides safe and easy access to system effluent for stormwater compliance sampling.

Figure 3:
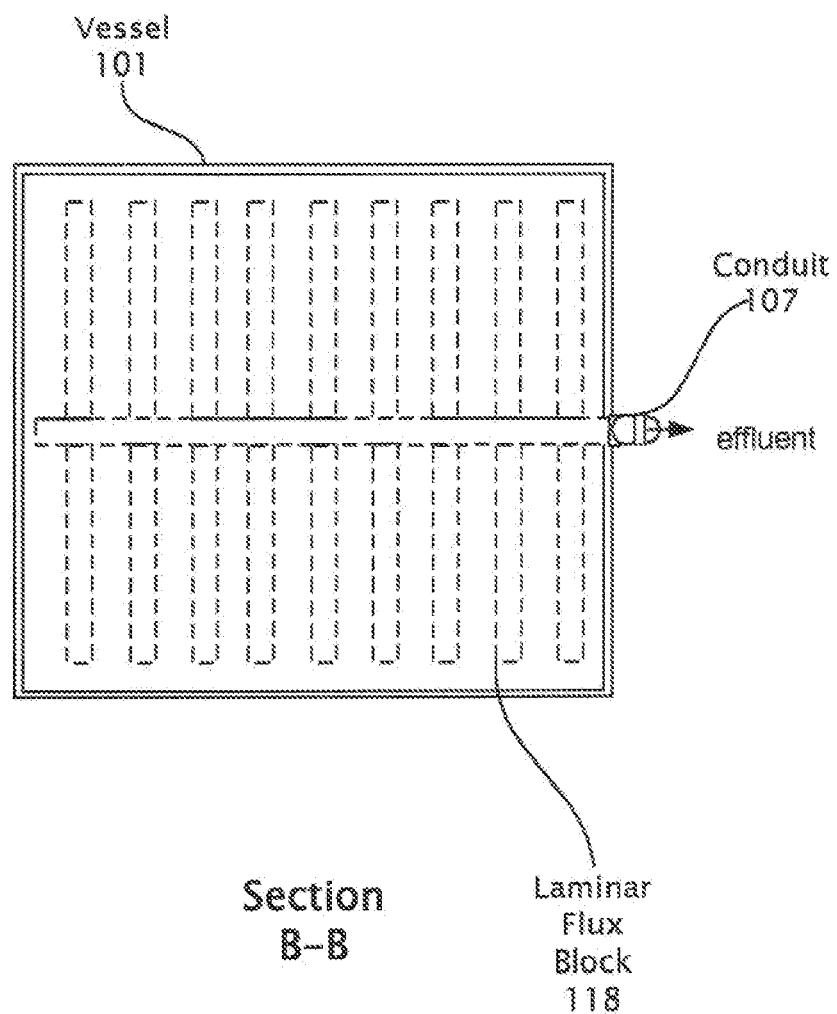
FIG. 3 shows a top view of the saturated layer stormwater filter with an underdrain.

FIG. 3 shows a top view of the saturated layer stormwater filter with an underdrain, or laminar flow block 118. The laminar flux block shown here is a collection structure of connected piping that collects and channels treated stormwater to conduit 107.

Figure 4:
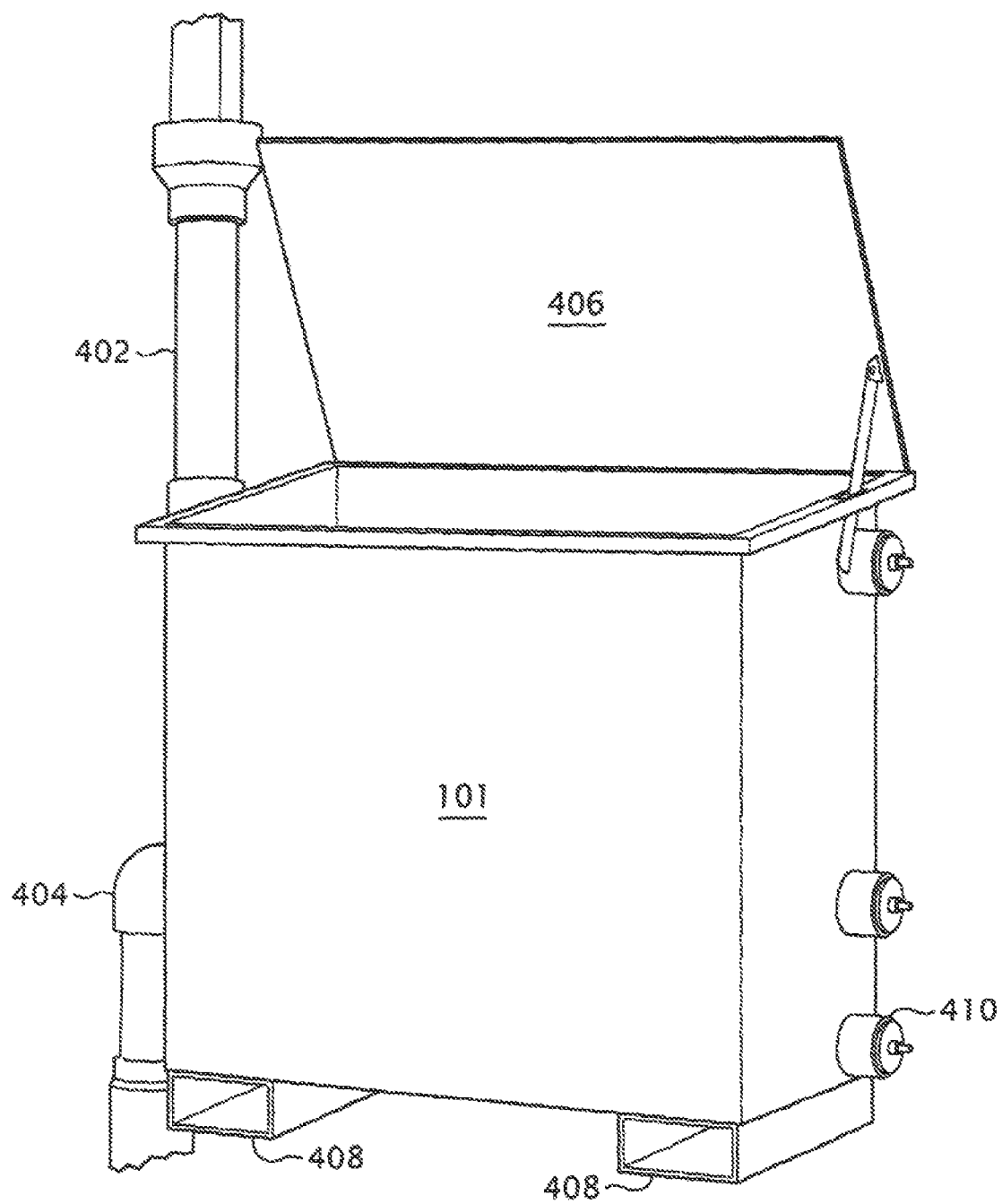
FIG. 4 shows an exemplary saturated layer stormwater filter system (single internal chamber) installed and coupled to a downspout.

FIG. 4 shows an exemplary stormwater filter system (single internal chamber) installed and coupled to a downspout 402, via an inlet connection point adapter 155. The exemplary stormwater filter system includes a vessel 101, filter media (as shown in FIG. 1) therein, an inlet distribution header on top of the filter media (not shown), and internal baffles and outlet plumbing 404. The system may also include a lid 406 and an inlet filter (or debris) screen (not shown) disposed above the media layer for preliminary filtering. In some examples, the system may be transported with the outlet plumbing disassembled to prevent damage during transportation. For ease of installation and maintenance, forklift pocket inlets 408 are included.

For roof runoff installations, the system should be placed at the location of a facility's roof downspout 402 so that the incoming stormwater flows downward into the side of the filtration system through connection point 155. Furthermore, the system may have the outlet plumbing installed prior to use. The outlet plumbing comprises an adapter 404 coupling the treated water to the facility drainage system. To install the arm, the threaded plug 410 needs to be removed to drain water within the container 101.

Figure 5:
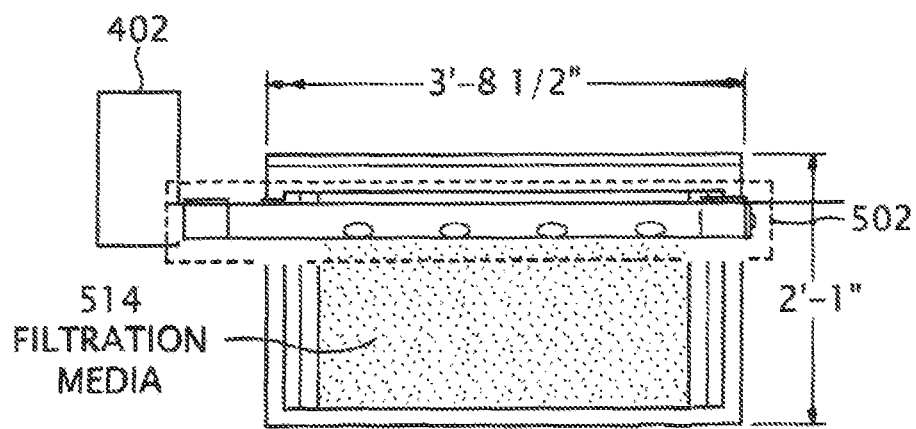
FIGS. 5-7 show an attached piping mechanism to couple the downspout stormwater filter system of FIG. 4 to a building's downspout.

FIGS. 5-7 shows a distribution system 502. The distribution system 502 includes an attached piping mechanism 155 to couple the downspout stormwater filter system of FIGS. 1-2 to a building's downspout as installed in a saturated layer filtration media 514 (shown in further detail in 100 of FIGS. 1-2 and 4), and a distribution header 110. The stormwater filter system includes a container 101, an inlet debris screen 102, an inlet distributor 110, fork pocket feet 408, a drain down port 410, and a sample port 508. A connection point assembly 155 couples to an existing downspout 402 to route stormwater influent into the container 101. Treated stormwater exits the device at outlet 404. Dimensions shown are provided only by way of example and are not intended to be limiting.

Alternative examples may include a high flow bypass 1012. The high flow bypass couples between the container and the existing downspout to rout excessive influent into the container back to the existing downspout, when the influent rate is beyond the capacity of the stormwater filter system. An adjustable head control 1210-- couples the container effluent conduit (107 of FIGS. 1-2) to the existing downspout.

Figure 8:
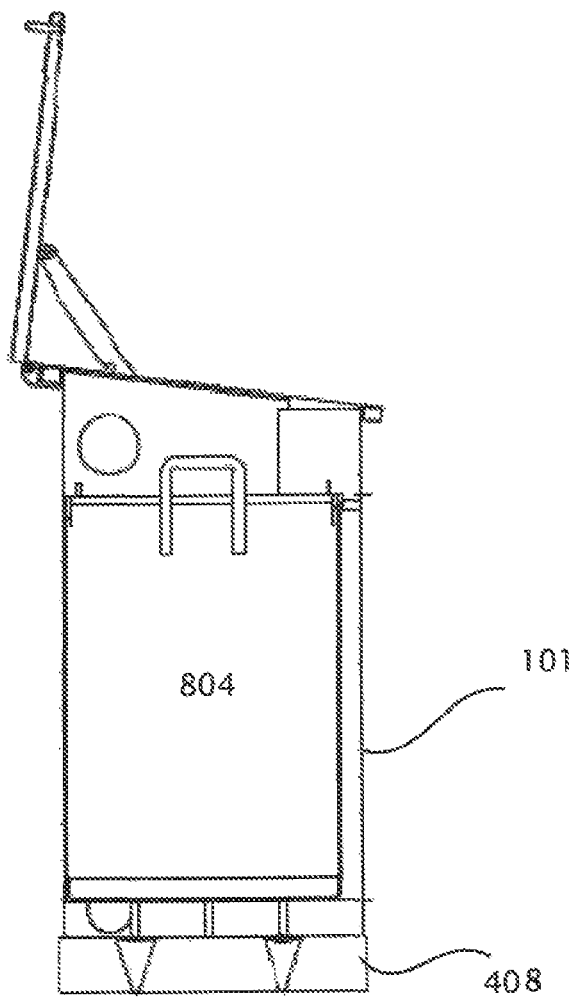
FIG. 8 shows a further alternative example of a stormwater filter housing with a removable filter basket.

A downspout installation is only one example how the filtration systems can be used for stormwater treatment. These systems may also receive stormwater that was collected in a below-grade conveyance system and pumped to the filtration system. These filtration systems may be above grade, below grade, portable and user build configurations. Such alternative configurations may also include an open top for easy access, as well as built in ladders 1014 to aid in maintenance. Further alternative examples of the stormwater filter may include freeze protection, soft or rigid covers, and seismic tie-downs and the like. Portable configurations are a more portable variant of the above grade filter. In above grade installations a steel or similar material housing the filter can be moved into place quickly (FIGS. 8-9 below). Apertures to accommodate a forklift may be included in various vessel configurations to aid in movement.

In the below grade installation configuration a precast concrete, or vault may enclose the filter. A precast lid with an access port may be supplied to cover the top of the unit when it is buried, or covered. Finally, in the user build filter, the container is constructed by the end-user to the specifications the filtration equipment provider such that an equivalent filtration system can be assembled onsite with the procurement of the equipment provider internals.

FIG. 15 shows further details of distribution header 110 as it is constructed for use in FIGS. 5-7. The header may be disposed above energy dissipating fabric 1504 and may include a plurality of apertures 1506 disposed in a main pipe so that stormwater flows from the top, then downward. In addition numerous smaller appertures 1508 may be disposed along the bottom of the pipe that makes up this particular example of a distribution header 110.

FIGS. 8-9 shows a further alternative example of a stormwater filter housing vessel 101 with a removable filter media basket 804. The structure includes a housing and media chamber and debris screen and internal baffles (not shown). The design shown tends to be easy to produce, install and service. Service may be facilitated by inclusion of a debris screen and internal baffles. Installation is facilitated by the inclusion of forklift pockets. The shape shown is exemplary, and may take a variety of forms as may be desired.

In some examples, a downspout stormwater filter system may also be configured in a system that has a pretreatment chamber and a filtration chamber containing the stormwater type filter.

Saturated Layer Stormwater Filter with Pretreatment

Providing separate pretreatment and filtration chambers in a system having a stormwater filter is afforded in larger systems and tends to reduce system maintenance. Pretreatment may typically be classified as either upflow or downflow by its construction. Upflow pretreatment tends to be more advantageous than downflow pretreatment because of simplified construction, and the ability to include a mosquito barrier and an oil skimmer.

Both chambers (containers) containing the pretreatment mechanism and the stormwater filter, may be scaled up or down to accommodate different flow rate configurations. The pretreatment chamber may be an upflow pretreatment. The stormwater filter system may also include an oil baffle and sorptive boom for oils removal, an instantaneous and/or totalizing flow meter (which may be battery operated, or equivalent), flow control valves, a float-actuated pump to drain large volumes of water within this pretreatment chamber, and/or a lockable lid.

FIGS. 10-11 show various view of an exemplary stormwater filter system 700 having an upflow pretreatment chamber 710 and a filtration chamber 720 including the stormwater filter described above or alternative filtration configurations.

The filter media is easily cleaned, as by scraping and/or adding filter media material when existing material's surface structure becomes occluded and particulate capture capacity is exhausted. The relatively simple to install and maintain stormwater management apparatus 100 tends to be cost effective and effective in removing pollutants from the treated effluent, thereby protecting the environment.

An overflow indicator 1016 is a feature that makes a semi-permanent record of an event where stormwater inside the system has bypassed filtration. This happens when the filter media is plugged and water is not able to flow through the media, forcing the stormwater to bypass filtration by leaving the system through the overflow plumbing 1012. The overflow indicator allows for the system operator to stay aware of what has happened within the system without having to be present at the time of bypass. The overflow is directed back onto the ground or to the system outlet.

In some examples, the influent and the effluent have the same flow direction or have flow directions perpendicular to each other.

FIG. 10 shows a perspective cut away view of an exemplary stormwater filter system with an upflow pretreatment chamber. Such a system may also be pump fed, rather than by the action of gravity. The figure shows a stormwater management system with a unique upflow pretreatment, and downflow filtration. The downflow filtration section may be adapted from the saturated layer stormwater filter described above.

Alternatively, for pretreatment, this filter system may incorporate features disclosed in U.S. Pat. No. 8,002,974, "Passive stormwater management system", the disclosure of which is herein incorporated by reference. However, the system described in U.S. Pat. No. 8,002,974 utilizes a differing downflow (rather than upflow described herein) pretreatment chamber.

In the upflow pretreatment chamber the construction is simplified from the previously available downflow type (FIGS. 16-17). In the upflow system described herein, the pretreatment chamber typically includes a filter medium between the inlet plumbing and the inlet to the filter chamber. Influent enters the pretreatment chamber near its bottom. As the influent rises it flows through the pretreatment filter (from bottom to top of chamber) and then into the filter chamber.

The pretreatment chamber is customized to naturally balance the water chemistry and improve the quality of the stormwater. The pretreatment chamber can be configured to contain a debris screen (as described in saturated layer stormwater filter section), settle solids, remove oil, and/or contain conditioning media for enhanced dissolved metals removal. The conditioning process works synchronously with the reactive filtration media, coagulating particulates, adsorbing dissolved metals and creating metal complexes that are more easily removed in the filtration chamber. A mosquito barrier layer is provided to prevent breeding in the pretreatment chamber.

As shown in the FIGS. 10-12, polluted stormwater flows into the pretreatment chamber 710 via the inlet pipe 1002, which is positioned near the bottom of the pretreatment chamber 710 for upflow pretreatment. As the water in the pretreatment chamber rises it enters the filtration chamber 720, through distribution header 110. Here the water is filtered as previously described in FIGS. 1-2. Filtered water flows into the outlet 512, via a conduit, which may be provided with a sample port 508. Also coupled to the output 512, is an overflow port 1012. A ladder 1014 may be added to provide access.

The stormwater filter system 1000 may be configured with structure using steel, plastic, concrete, fiberglass, or earthen construction. The stormwater filter system 1000 may also be installed for above-ground applications, designed in a pre-cast concrete vault or panel-vault for buried applications, or both downspout and wash rack configurations. The below ground configuration can be supplied with a solid lid for traffic rated applications or with an open top for easy inspection and maintenance.

Stormwater Conveyance Control with Saturated Layer Stormwater Filter with Pretreatment FIG. 12 is a side sectional view of detention stormwater conveyance control with a saturated layer stormwater filter system 700 with pretreatment in an intermodal container configuration, modified standard post flat design 1200 and an optional stormwater detention storage tank 1202. A filtration media 1212 layer is positioned below the distribution header 110. The intermodal post flat configuration provides for multiple stackable saturated layer stormwater filter with pretreatment modules alone or including detention stormwater conveyance control. The intermodal post flat units are portable, being easy to pick, move and place with standard container handling equipment including container gantry cranes, reach stackers, and similar equipment, and can be transported on marine, rail and trucks stanches designed for standard intermodal containers.

FIG. 13 shows a treatment system that includes a saturated layer stormwater filter with pretreatment with a stormwater conveyance control bypass pump vault. Existing storm drain pipe feeds into a system 1300 with treatment pump and floats and a high flow bypass weir. An output of the system 1300 is pumped via flow inlet pipe 1306 to a first chamber and enters the first chamber through the inlet pipe 1304 below a filter layer. Once the fluid passes through the filter layer it enters the distribution header 110 which has a plurality of apertures for allowing the fluid to flow onto the top of the filtration media. An emergency overflow 1210 is provided to divert overflow fluid. Once the fluid passes through the filtration media 1212, it exist the system via outlet 1302.

FIG. 14 shows a treatment system that includes a saturated layer stormwater filter similar to FIG. 13 with pretreatment and a stormwater conveyance control configuration.

Saturated Layer Stormwater with Downflow Pretreatment

FIGS. 16 and 17 collectively show stormwater management apparatus or system 101 in accordance with a downflow pretreatment example of the invention. Apparatus 101 includes a pretreatment mechanism 10a and a filter mechanism 10b, although those of skill in the art will appreciate that pretreatment mechanism 10a may not be required in certain applications. In the illustrated example, pretreatment mechanism 10a and filter mechanism 10b are housed in any suitable structure of any suitable shape and size. Apparatus 10 includes a sealed container or vessel 12 having four sidewalls and a base, the vessel configured to contain a defined volume of layered filter media 14 entrained with a defined volume of water W introduced into the vessel. Apparatus 10 will be understood to be a flow-through apparatus, in that the influent at the inlet is gravity fed to the outlet as effluent, whether in batch or continuous mode of filter operation. Those of skill in the art will appreciate that vessel 12 can be made of steel, concrete, aluminum, fiberglass, high density polyethylene (HDPE), or any other suitably durable material.

In accordance with one example of the invention, vessel 12 is right rectangular relative to all three orthogonal axes, as can be seen from FIGS. 1 and 2. Those of skill will appreciate that the generally horizontal aspect ratio of the rectangles affects the hydraulics and thus the gravity-fed flow of stormwater through the layered filter media arranged within the vessel. In accordance with one early example of the invention, vessel 12 is approximately 9 feet in length, 2.5 feet in width, and 4 feet in height, for approximately a 7 gallon per minute (gpm) flow rate or throughput. In accordance with another large-scale roll-off box example, vessel 12 is approximately 16 feet in length, 8 in width, and 6 feet in height, for an approximately 100 gpm flow rate. In yet another stacked tote example, vessel 12 is approximately 4 feet in length and width, and 8.5 feet in height, for an approximately 10 gpm flow rate.

Those of skill in the art will appreciate that suitable alternative lengths, widths, heights, proportions or aspect ratios, and flow rates or throughputs are contemplated, and that all are within the spirit and scope of the invention.

Apparatus 10 further includes influent (e.g. stormwater) inlet 16a in an upper edge region of vessel 12. Apparatus 10 further includes an effluent (e.g. purified stormwater) outlet 18 in a lower edge region near the base of vessel 12. Thus, those of skill in the art may appreciate that apparatus 10 relies on gravity movement of water from inlet to outlet via the layered filter media. Such a gravity-reliant system or apparatus as apparatus or system 10 thus is referred to herein as involving "passive" water management.

Layered filter media 14 in accordance with one example of the invention includes a lower layer 14a of coarse media such as gravel, an overlying first intermediate layer 14b of granular activated carbon (GAC), an overlying second intermediate layer 14c of activated alumina, and an overlying top layer 14d of medium sand. The intermediate and upper layers can be in an approximately equal volumetric ratio, as can the lower layer, although those of skill in the art will appreciate that the intermediate layers can be omitted altogether and the others placed in any suitable form or ratio. Thus, those of skill in the art will appreciate that these illustrative media layers described above can be more, fewer, of different material, of different configuration, of different proportion, in different order bottom to top, etc. Any suitable layered filter media 14 makeup is contemplated as being within the spirit and scope of the invention.

Immediately above lower layer 14a in accordance with one example of the invention is a layer 20 of fabric of defined weight and extent for preventing migration of media therebetween. Geotextile fabric or any suitable alternative can be used that is substantially impervious to the filter media but easily penetrated by water. Another layer 22 of fabric overlies upper layer 14d, which topmost layer also can be geotextile or any suitable alternative. Topmost layer 22 of fabric also can be of any suitable weight or extent, and may, in accordance with one example of the invention, be coextensive with (of generally equal surface area to, congruent with) the upper filter media surface otherwise exposed, thereby substantially to cover the otherwise exposed filter media surface. Those of skill in the art will appreciate that topmost layer 22 protects the layered filter media from the elements, e.g. weather, falling debris, leaves or twigs, etc.

Topmost layer 22 acts in accordance with the invention to other beneficial effect: it disperses impact energy from the stormwater entering vessel 12 via inlet 24. Topmost layer 22 also cooperates in accordance with one example of the invention with a dispersing structure, or distribution header, 24 extending above the layered filter media and topmost layer 22. Distribution header 24 can be seen from FIG. 1 to be in fluid communication with inlet 16b. While only one distribution header 24 is visible in FIG. 1, it can be seen from FIG. 2 that more than one header can be provided to further distribute stormwater over and across the surface of topmost layer 22. Those of skill in the art will appreciate that distribution header 24 can take any suitable form, but that, in accordance with one example of the invention, it is a capped length of perforated pipe, e.g. of PVC.

The so-called "media saturation" level of water within vessel 12 is easily and manually adjustable for optimum tradeoff between effluent throughput and purity. Pivotable lever 28 as a part of outlet 18 includes therein a standing-column of water in fluid communication with the water within vessel 12. Thus, by manually pivoting lever 28, the communicative "media saturation" water level within vessel 12 quickly and manually can be raised or lowered to optimize performance of apparatus 10. This avoids more complex and failure-prone floats and valves or other metering and level control devices.

In accordance with another example of the invention, pretreatment mechanism 10a includes a granular conditioning medium 32, e.g. a geotextile bag filled with granular passive adsorptive media such as brucite or calcite or a suitable alternative. The conditioning agent breaks down naturally into alkalinity and hardness ions, both of which are present in abundance in natural water ecosystems. The conditioning agent naturally increases the alkalinity and reduces the acidity of stormwater influent within stormwater management mechanism 10a to reduce the solubility of heavy metals therein. Typically, stormwater might have a pH of approximately 5, which relatively low pH tends to maintain certain pollutants such as heavy metals dissolved in solution, e.g. ionized. The stormwater management mechanism 10a naturally raises the pH and thereby induces precipitation of metals via metal hydroxide or metal carbonate formation, effectively releasing such solubilzed heavy metals from solution so that they can be more effectively captured within layered filter media 14.

Those skilled in the art will realize that the stormwater filter system can be constructed with various configurations. For example a stormwater filter system may comprise different piping configurations other than disclosed in the aforementioned examples. Those skilled in the art will also realize that a stormwater filter system may further incorporate different components. The foregoing description of the invention has been described for purposes of clarity and understanding. Various modifications may be implemented within the scope and equivalence of the appended claims.

The invention claimed is:

1. A two-chamber stormwater filter system comprising:
   a pretreatment chamber having an upper chamber and a lower chamber including:
      an inlet pipe disposed at a bottom of the pretreatment chamber to receive stormwater influent and configured to deliver the stormwater influent to the lower chamber of the pretreatment chamber;
      a pretreatment filtration media layer positioned continuously above lower chamber for stormwater influent pretreatment configured to receive an upward flow of stormwater influent from the lower chamber inlet pipe and discharging a pretreated stormwater output to the upper chamber;
   a filtration chamber including:
      layered saturated and unsaturated filter media with a barrier layer therebetween, and configured to receive the pretreated stormwater output from the upper chamber of the pretreatment chamber at a filtration chamber top inlet; and
   a distribution header with an inlet opening and a distribution outlet to receive and distribute the pretreated stormwater over the surface of the layered saturated and unsaturated filter media, the inlet opening being positioned above the layered saturated and unsaturated filter media wherein the distribution outlet has a first row of apertures having a first diameter and a second row of apertures having a second diameter larger than the first diameter;
   a frame to support the filter system and containing the pretreatment chamber and the filtration chamber in a side by side arrangement; and
   an effluent pipe to collect the treated stormwater from the filtration chamber for discharge; and a rotatably adjustable conduit coupled to the effluent pipe for maintaining a desired water level in the filtration vessel.

2. The stormwater filter system of claim 1, wherein the distribution header distributes the pretreated stormwater uniformly over a top surface of the filtration chamber.

3. The stormwater filter system of claim 1, wherein the pretreated stormwater flows into the distribution header by gravity.

4. The stormwater filter system of claim 1, further comprising: a fabric media covering the saturated and unsaturated filter media in the filtration chamber that provides energy dissipation to prevent scouring of at least one of the plurality of treatment media in the filtration chamber.

5. The stormwater filter system of claim 1, wherein the pretreatment media is selected from the group of materials consisting of chemical and mechanical conditioning of the stormwater influent.

6. The stormwater filter system of claim 1, wherein the filtration chamber further comprises an emergency overflow outlet to provide a means for stormwater to bypass the treatment media in case the filter becomes plugged.

7. The stormwater filter system of claim 6, wherein the emergency overflow outlet is positioned above the distribution header of the inlet distributor.

8. The stormwater filter system of claim 1, wherein the at least one layer of the plurality of treatment media comprise unsaturated filter media and saturated media positioned beneath the unsaturated filter media.

9. The stormwater filter system of claim 8, wherein the filtration chamber further comprises a laminar flux block disposed evenly beneath the saturated filter media, the laminar flux block coupled to the effluent pipe to promote an even laminar flow through the treatment media.

10. The stormwater filter system of claim 1, wherein the at least one layer of treatment media comprises one layer of an adsorptive/ion exchange media.

11. A two-chamber stormwater filter comprising:
a pretreatment chamber having an upper chamber and a lower chamber with a filter disposed therein between the upper chamber and the lower chamber, wherein the pretreatment chamber is configured with an inlet to fill the lower chamber with stormwater from a bottom of the pretreatment chamber, and an outlet positioned at a top of the pretreatment chamber, and further wherein the stormwater received via the inlet flows in an upward direction through the filter and out of the top of the pretreatment chamber;
a vessel disposed in horizontal relationship to the pretreatment chamber, the vessel and pretreatment chamber supported by a framed structure;
an inlet pipe coupled to the outlet of the pretreatment chamber disposed at a top portion of the vessel, and entering the vessel through an inlet aperture;
a distribution header coupled to the inlet pipe with a plurality of apertures wherein the plurality of apertures includes a first row of apertures having a first diameter and a second row of apertures having a second diameter larger than the first diameter;
a plurality of unsaturated filter media layers disposed below and in substantially parallel orientation to the distribution header in a vertical stack of layers;
a plurality of saturated filter media layers disposed below and in substantially parallel orientation to the plurality of unsaturated filter media layers in a vertical stack of layers;
a barrier seal disposed about a perimeter of the inside of the vessel, and between adjoining media layers; and
a bottom collection device disposed at the bottom of the vessel and below the plurality of saturated filter media layers extending through an aperture disposed in the vessel.

12. The stormwater filter of claim 11 further comprising a conduit assembly outside the vessel, and rotatably coupled to the bottom collection device where the bottom collection device extends through the aperture.

13. The stormwater filter of claim 12 in which the conduit assembly includes an effluent sample port.

14. The stormwater filter of claim 11 in which the bottom collection device is a perforated grate wrapped in geotextile.

15. The stormwater filter of claim 11 in which the bottom collection device is a laminar flux device including a main distribution pipe and a plurality of perforated pipes coupled to the main distribution pipe.

16. The stormwater filter of claim 11 further comprising a debris screen disposed between the distribution header and a first layer of the plurality of unsaturated filter media layers.

17. The stormwater filter of claim 11 further comprising a perforated debris basket disposed between the distribution header and a first layer of the plurality of unsaturated filter media layers.

18. The stormwater filter of claim 11 further comprising a pretreatment vessel coupled to the inlet aperture and configured to receive stormwater of a given rate at which time when the given rate is exceeded the stormwater flows into the vessel through the inlet aperture.

19. The stormwater filter of claim 18 further comprising pretreatment media selected from the group consisting of chemical and mechanical conditioning disposed in the pretreatment vessel.

20. The stormwater filter of claim 11 further comprising a detention storage tank disposed above the vessel, in a stacked configuration and having a foot print substantially the same as the vessel.

* * * * *